US009506433B2

United States Patent
Gänswein et al.

(10) Patent No.: US 9,506,433 B2
(45) Date of Patent: Nov. 29, 2016

(54) FUEL SUPPLY SYSTEM

(71) Applicant: Mahle International GmbH, Stuttgart (DE)

(72) Inventors: Matthias Gänswein, Esslingen (DE); Joern Wetzel, Stuttgart (DE); Stefan Jauss, Donzdorf (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/897,878

(22) PCT Filed: Jun. 10, 2014

(86) PCT No.: PCT/EP2014/061967
§ 371 (c)(1),
(2) Date: Dec. 11, 2015

(87) PCT Pub. No.: WO2014/198687
PCT Pub. Date: Dec. 18, 2014

(65) Prior Publication Data
US 2016/0108871 A1    Apr. 21, 2016

(30) Foreign Application Priority Data

Jun. 12, 2013   (DE) .................... 10 2013 210 973

(51) Int. Cl.
*F02M 37/00*     (2006.01)
*F02M 37/18*     (2006.01)
(Continued)

(52) U.S. Cl.
CPC ............. *F02M 37/18* (2013.01); *B60K 15/03* (2013.01); *F02M 37/0035* (2013.01);
(Continued)

(58) Field of Classification Search
CPC ................ F02M 37/0023; F02M 37/0029; F02M 37/0035; F02M 37/0047; F02M 37/0052; F02M 37/0088; F02M 37/20; F02M 37/221
USPC ......................... 123/514, 516, 464
See application file for complete search history.

(56) References Cited

U.S. PATENT DOCUMENTS 4,385,615 A * 5/1983 Keane ................. F02D 19/0647
                                                    123/514
4,452,213 A * 6/1984 Duprez ................. F02M 31/16
                                                    123/514

(Continued)

FOREIGN PATENT DOCUMENTS

DE         3530970 A1    5/1987
DE        19509143 A1    9/1996

(Continued)

OTHER PUBLICATIONS

English abstract for DE-102010043644.

(Continued)

*Primary Examiner* — Thomas Moulis
(74) *Attorney, Agent, or Firm* — Fishman Stewart PLLC

(57) ABSTRACT

A fuel supply system for an internal combustion engine may include a first tank and a second tank connected to each other via a fuel line. A first pump and a first fuel filter may be arranged between the first tank and the second tank. A second fuel pump and a second fuel filter may be arranged between the second tank and the engine. The first fuel filter may have a water separator. A first return line may be fluidly connected to the engine on an inlet side and to the second tank on an outlet side and/or the first fuel filter on a raw side. A preheating valve may be arranged in the first return line and be configured to distribute the fuel flowing back from the engine to the first fuel filter and/or the second tank. A second return line may connect the first and second tank.

20 Claims, 2 Drawing Sheets

(51) Int. Cl.
*F02M 37/22* (2006.01)
*B60K 15/03* (2006.01)

(52) U.S. Cl.
CPC ...... *F02M 37/0088* (2013.01); *F02M 37/221* (2013.01); *F02M 37/223* (2013.01); *B60K 2015/03118* (2013.01); *B60K 2015/03138* (2013.01); *B60K 2015/03144* (2013.01); *B60K 2015/03236* (2013.01)

(56) References Cited

U.S. PATENT DOCUMENTS

| | | | |
|---|---|---|---|
| 4,546,750 A | 10/1985 | Brunell et al. | |
| 4,582,039 A * | 4/1986 | Nishida | F02M 37/0088 123/510 |
| 4,617,116 A * | 10/1986 | Seiler | B01D 35/147 123/514 |
| 4,620,568 A * | 11/1986 | Sumerford | F02D 19/0618 123/515 |
| 4,625,701 A * | 12/1986 | Bartlett | F02M 31/16 123/510 |
| 4,932,609 A * | 6/1990 | Secchiaroli | B64C 17/10 137/256 |
| 5,085,198 A * | 2/1992 | Bartlett | F02D 33/006 123/381 |
| 5,197,443 A * | 3/1993 | Hodgkins | B60K 15/077 123/510 |
| 5,263,456 A * | 11/1993 | Owen-Evans | F02D 33/006 123/495 |
| 5,287,841 A * | 2/1994 | Forsythe | F02M 37/0023 123/510 |
| 5,339,787 A * | 8/1994 | Jungquist | F02D 33/006 123/510 |
| 5,360,034 A * | 11/1994 | Der Manuelian | B60K 15/077 123/514 |
| 5,555,873 A * | 9/1996 | Nolen | F02M 37/0064 123/575 |
| 5,832,902 A * | 11/1998 | Davis | F02D 33/006 123/514 |
| 5,913,294 A | 6/1999 | Takahashi et al. | |
| 5,983,932 A * | 11/1999 | Wagner | B60K 15/03 123/509 |
| 6,412,475 B1 | 7/2002 | Joos et al. | |
| 6,514,404 B1 | 2/2003 | Bauer | |
| 6,920,866 B2 * | 7/2005 | Leini | B60K 15/03 123/514 |
| 7,168,415 B2 * | 1/2007 | Studebaker | F02D 33/003 123/509 |
| 7,182,071 B2 * | 2/2007 | Hansson | B60K 15/03 123/514 |
| 7,246,606 B2 * | 7/2007 | Tokumaru | F02M 25/089 123/514 |
| 7,318,424 B2 * | 1/2008 | Callahan | A01D 34/82 123/516 |
| 7,441,548 B1 | 10/2008 | Onishi et al. | |
| 7,681,556 B2 * | 3/2010 | Hwang | E02F 9/00 123/510 |
| 7,883,627 B1 | 2/2011 | Barrett | |
| 8,333,177 B2 * | 12/2012 | Kuhn | B60K 15/01 123/495 |
| 8,579,332 B2 * | 11/2013 | Sonderegger | B60K 15/03 123/514 |
| 9,157,393 B2 | 10/2015 | Fulton et al. | |
| 2002/0062819 A1 * | 5/2002 | Takahashi | F02B 61/045 123/519 |
| 2002/0083923 A1 | 7/2002 | Suzuki et al. | |
| 2003/0150783 A1 * | 8/2003 | Roesgen | B01D 29/608 210/97 |
| 2007/0062494 A1 * | 3/2007 | Yanagi | B01D 35/147 123/514 |
| 2009/0165748 A1 * | 7/2009 | Yamamoto | F02M 37/0035 123/447 |
| 2009/0211559 A1 | 8/2009 | Appleton et al. | |
| 2009/0235896 A1 * | 9/2009 | Gruber | F02D 19/087 123/27 R |
| 2014/0000727 A1 * | 1/2014 | Fisher | F02M 37/0052 137/468 |

FOREIGN PATENT DOCUMENTS

| | | |
|---|---|---|
| DE | 19847999 A1 | 4/2000 |
| DE | 19936287 A1 | 2/2001 |
| DE | 10010517 A1 | 9/2001 |
| DE | 10132187 A1 | 1/2003 |
| DE | 102006059685 A1 | 6/2008 |
| DE | 102009008488 A1 | 8/2009 |
| DE | 102010043644 A1 | 5/2012 |
| DE | 102012202023 A1 | 8/2012 |
| EP | 1154147 A2 | 11/2001 |
| JP | H04-11249 U | 1/1992 |
| JP | H09-144616 A | 6/1997 |
| JP | 2008-255868 A | 10/2008 |
| JP | 2010-106662 A | 5/2010 |
| WO | WO-2010149642 A1 | 12/2010 |

OTHER PUBLICATIONS

English abstract for DE-10010517.
English abstract for EP-1154147.
English abstract for DE-10132187.
English abstract for DE-19509143.
English abstract for DE-102006059685.
English abstract for JP-2010-106662.
English translation Japanese Office Action for JP-2015-563157, mailed Jun. 14, 2016.

* cited by examiner

FUEL SUPPLY SYSTEM

CROSS-REFERENCE TO RELATED APPLICATIONS

This application claims priority to German Patent Application No. 10 2013 210 973.3, filed Jun. 12, 2013, and International Patent Application No. PCT/EP2014/061967, filed Jun. 10, 2014, both of which are hereby incorporated by reference in their entirety.

TECHNICAL FIELD

The present invention relates to a fuel supply system of an internal combustion engine. The invention additionally relates to a motor vehicle with such a fuel supply system and a method for operating such a fuel supply system.

BACKGROUND

From U.S. Pat. No. 4,546,750 a generic fuel supply system is known, with a first tank and a second tank, constructed as a buffer reservoir. The second tank is arranged here within the first tank and comprises a fuel pump, arranged therein, which draws fuel out from the first tank via a fuel filter.

Further fuel supply systems are known from DE 199 36 287 C2, from DE 101 32 187 A1, from DE 195 09 143 A1 and from DE 10 2006 059 685 A1.

A disadvantage in known fuel supply systems is that these are often constructed in an uneconomical manner and often also can only be operated in an uneconomical manner due to the lack of corresponding control strategies.

SUMMARY

The present invention is concerned with the problem of indicating for a fuel supply system of the generic type an improved or at least an alternative embodiment, which in particular overcomes the disadvantages known from the prior art.

This problem is solved according to the invention by the subjects of the independent claim(s). Advantageous embodiments are the subject of the dependent claims.

The invention is based on the general idea of providing, in a fuel supply system known per se, a Y-shaped return line, which is connected to an internal combustion engine on the inlet side and opens into a second tank, constructed as a buffer reservoir, on the outlet side and into a fuel line upstream of a first fuel filter. In this first return line, a preheating valve is arranged here, which distributes the fuel, flowing back from the internal combustion engine, to the first fuel filter and/or to the second tank and thereby can cover the most varied of operating states of the internal combustion engine according to requirements. The fuel supply system according to the invention has here a first tank, constructed as a main tank, and the previously mentioned second tank, constructed as a buffer reservoir, which are both connected to one another via the likewise already mentioned fuel line. A first fuel pump, for example an electric pump, and the first fuel filter, serving as a pre-filter, are arranged here between the first and the second tank. On the other hand, a second fuel pump and a second fuel filter, which is constructed for example as main filter, are arranged between the second tank and the internal combustion engine. In the first fuel filter, i.e. for example in the pre-filter, a water separator is provided here for drying the fuel. Via the first return line, described initially, it is now possible to feed the fuel which is not required in the internal combustion engine and therefore not burned, optionally into the intermediate tank, i.e. the second tank, or else on the raw side into the first fuel filter, whereby for example the respective delivery volume of the first fuel pump and therefore also the output required for this can be adapted optimally to individual operating states of the internal combustion engine.

In an advantageous further development of the solution according to the invention, a sensor arrangement is provided, which detects a thickening of the fuel due to temperature or a clogging of the first and/or second fuel filter. Such a sensor arrangement can comprise, for example, a pressure sensor and/or a temperature sensor. In addition, a control/regulation arrangement is provided, which is connected in a communicating manner on the one hand with the preheating valve in the first return line and on the other hand with the sensor arrangement and thereby can control or respectively regulate the preheating valve as a function of the parameters transmitted by the sensor arrangement. In an alternative embodiment, a distinct control apparatus in the fuel supply system can be dispensed with, and the control- and regulation signals can be sent directly from the engine control unit. When, for example, a temperature sensor of the sensor arrangement detects a temperature at which a congealing of the fuel, i.e. a thickening thereof, occurs, this can by counteracted by the fuel flowing through the first and second fuel filter being previously heated. When the temperature sensor therefore detects a critical temperature, the control/regulation arrangement switches the preheating valve such that the fuel flowing back from the internal combustion engine is introduced at least predominantly upstream of the first fuel filter into the fuel line and is mixed with the comparatively colder fuel originating from the first tank. The preheating valve does not necessarily have to be an electrically operating valve here, but can also be configured as a mechanical valve, e.g. as a thermal bimetal valve or as a thermostatic valve. By the mixing of the back-flowing fuel and of the fuel originating from the first tank, the temperature of the fuel as a whole is raised and thereby the risk of congealing is prevented or respectively at least reduced. A reaction can also take place in the same manner when a pressure sensor of the sensor arrangement detects a rising of the pressure. A pressure rise can likewise be connected to a lack of flowability of the fuel, which in turn can be at least attenuated by a heating of the fuel.

The invention is further based on the general idea of indicating a method for the operation of a previously described fuel supply system, through which the most varied of operating states of the internal combustion engine can be taken into consideration in an optimum manner. The method according to the invention differentiates four different modes of operation here, namely an operating mode I, which represents the normal operation, an operating mode II, in so far as there exists a risk of thickening of the fuel or a clogging of the fuel filter, an operating mode III, in so far as there exists a risk of overheating of the internal combustion engine, and an operating mode IV, in which an active drying of the fuel in the first tank, i.e. in the main tank, can take place.

In normal operation, i.e. in operating mode I, the first fuel pump, i.e. the electric pump, conveys only as much fuel as is also required, i.e. burned, by the internal combustion engine. In this operating state, therefore, no fuel flows back through the second return line from the second tank into the first tank, because the entire fuel conveyed by the first fuel pump is burned in the internal combustion engine. Hereby, the necessary pump output and also the necessary energy for operating the first fuel pump can be minimized and thereby the entire fuel supply system can be optimized.

In operating mode II, the sensor arrangement, i.e. for example its temperature- and/or pressure sensor, detects a corresponding signal, which points to a risk of congealing of the fuel, i.e. a thickening of the fuel, or else a clogging of the first and/or second fuel filter. When the sensor arrangement delivers such a signal, the control/regulation arrangement switches the preheating valve, arranged in the first return line, such that the fuel flowing back from the internal combustion engine is introduced at least predominantly upstream of the first fuel filter into the fuel line or directly on the raw side into the first fuel filter and thereby the fuel flowing through the two fuel filters is heated. Through the heating of the fuel flowing through the two fuel filters, the tendency of the fuel to congeal is reduced and thereby also the risk of clogging of the fuel filters is minimized or respectively preferably even averted. In the case of a cold state of the internal combustion engine, this is of course of little help, because the fuel flowing back from the internal combustion engine is not yet warm enough. For this case, a corresponding heating arrangement, for example in the manner of PTC heating elements, can be provided upstream of the first fuel filter, which heating arrangement brings about a heating of the fuel and thereby a thinning thereof. Owing to modern fuels with a low risk of congealing, or respectively very low congealing temperatures, however, even purely theoretically such a heating arrangement can be dispensed with, whereby the fuel supply system according to the invention can be constructed in a structurally distinctly simpler and therefore more economical manner.

Operating mode III occurs in so far as a risk of overheating of the internal combustion engine exists and this must be protected from a corresponding overheating by a restriction of the maximum fuel inlet temperature. Conventionally, a cooler can be used for this. With the use of a conventional cooler, a pressure loss occurs in the line, which leads to an increased energy consumption. In the supply system according to the invention it is possible, however, to economize as regards such a separate cooler, which is not only costly, but in addition also has to be installed expensively, because in operating mode III the control/regulation arrangement switches the preheating valve in the case of a corresponding signal of the sensor arrangement so that the fuel flowing back from the internal combustion engine is introduced at least predominantly into the second tank. At the same time, the first fuel pump, which conveys the fuel from the first tank into the second tank, is increased with regard to its conveying capacity, so that it provides a delivery volume which lies above that which is burned in the internal combustion engine. The first fuel pump therefore conveys more fuel in operating mode III from the first tank into the second tank than the internal combustion engine consumes, so that via the second return line the warmer fuel flows back from the second tank into the first tank and is mixed there with the colder fuel. Hereby, a cooling takes place of the fuel flowing back from the second tank into the first tank, which is now fed in the cooled form by the first fuel pump to the second tank again. By means of operating mode III, it is therefore possible to limit the fuel inlet temperature for the internal combustion engine and thereby to reduce its risk of overheating, without an additional and expensive cooler.

Operating mode IV is activated in so far as a filling level detection arrangement in the first tank detects a filling of the first tank with new fuel. The filling level detection arrangement is connected here in a communicating manner with the control/regulation arrangement. Generally, in operating mode IV, the fuel is dried, i.e. the water content present therein is reduced. Freshly filled, i.e. freshly tanked, fuel usually has a water content which is to be separated via a corresponding water separator in the first fuel filter. In operating mode IV, therefore, the first fuel pump conveys fuel from the first tank through the first fuel filter and the water separator arranged therein, for example a coalescer, into the second tank, so that as a function of the operating state of the internal combustion engine, the fuel which is dried, i.e. dewatered, in the first fuel filter is fed exclusively to the internal combustion engine or flows back at least partially via the second return line from the second tank into the first tank and is mixed there with the fuel.

As a function of the operating state of the internal combustion engine means in this case basically the differentiation of at least two operating states, namely on the one hand the full load of the internal combustion engine and on the other hand the partial load of the internal combustion engine.

When the internal combustion engine is running under full load, no drying of the fuel is possible in the first tank, because the entire fuel conveyed by the first and second fuel pump is required completely in the internal combustion engine and is burned there. A flowing back of fuel into the first tank does not take place here, either from the internal combustion engine via the first return line or from the second tank via the second return line. In so far as the fuel supply system is designed so that power reserves are still also present under full load, a targeted fuel drying of the main tank is also possible under full load. The second operating state of the internal combustion engine concerns a partial load here, at which an active drying of the fuel is possible in the first tank, by the first fuel pump conveying more fuel than is burned by the internal combustion engine. The thus too much fuel conveyed into the second tank is dewatered, i.e. dried, in the first fuel filter and is now fed to the first tank again via the second return line. The dried fuel therefore mixes in the first tank with the original fuel and thereby reduces its water content or respectively its moisture content. The fuel drying in operating mode IV is carried out here at least until the entire tank contents have been dewatered. The return quantity from the second tank (hopper tank) determines here the duration of the fuel drying. Depending on the desired residual moisture in the fuel, several drying circulations of the fuel can be necessary. Alternatively, by means of a moisture sensor arranged in the first tank, a predefined moisture content can be determined, which the fuel drying deactivates. Purely theoretically, this moisture sensor can also be used in the reverse manner to activate the operating mode IV, in so far as the moisture sensor detects an exceeding of the predefined moisture content, for example a reaching or respectively exceeding of a predefined moisture threshold value. As already mentioned initially, the fuel drying can also be activated in operating mode IV, in so far as the filling level detection arrangement detects a filling of the first tank with new fuel, as this usually has a higher water content. Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown here, respectively diagrammatically.

DETAILED DESCRIPTION

Figure 1:
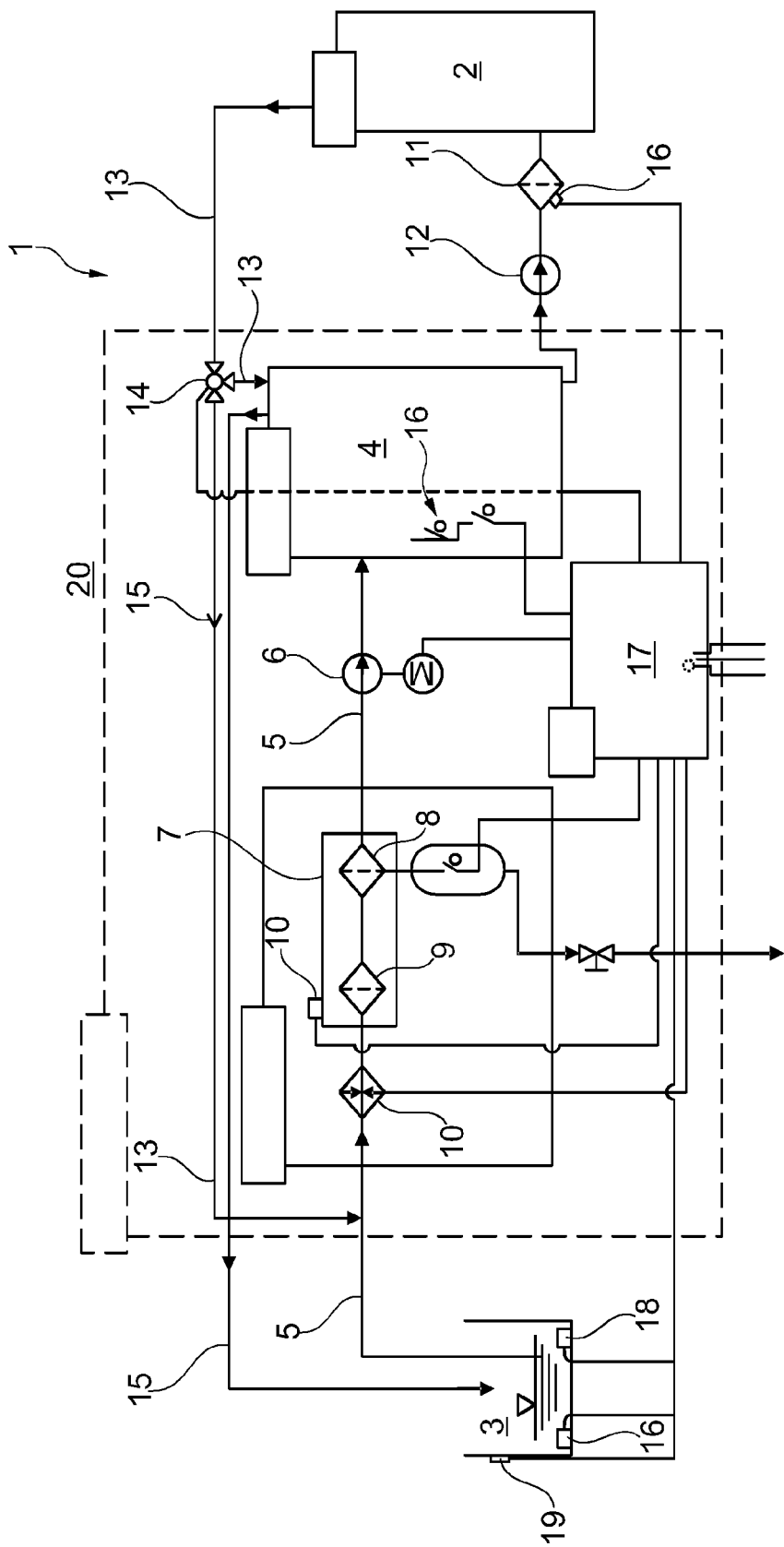
FIG. 1 a fuel supply system according to the invention.

According to FIG. 1, a fuel supply system 1, according to the invention, of an internal combustion engine 2 has a first tank 3 constructed as a main tank and a second tank 4 constructed as a buffer reservoir or respectively intermediate reservoir, which are connected to each other via a fuel line 5. A first fuel pump 6, for example an electric fuel pump, and a first fuel filter 7 serving as pre-filter are arranged here between the first tank 3 and the second tank 4, wherein in the first fuel filter 7 at the same time a water separator 8 is arranged. The first fuel filter 7 can comprise, in addition, a dirt filter 9 with a ring filter element 21 (cf. FIG. 2). A heating arrangement 10, connected upstream of the first fuel filter 7, can also be provided, which heating arrangement in particular in the case of a cold start of the internal combustion engine 2 and in cold environmental conditions prevents a congealing of the fuel and thereby a clogging of the first fuel filter 7 or respectively of a second fuel filter 11, which is constructed for example as main filter. The second fuel filter 11 is arranged here between the second tank 4 and the internal combustion engine 2, wherein in this region in addition a second fuel pump 12 is also arranged, which can be connected upstream of the second fuel filter 11 and constructed, for example, as a high pressure pump. The water separator 8 in the region of the first fuel filter 7 serves here in particular for the drying of the fuel which is fed to the internal combustion engine 2, i.e. for the reducing of a water content contained in the fuel.

Furthermore, in the fuel supply system 1 according to the invention a first return line 13 is provided, which is connected to the internal combustion engine 2 on the inlet side and opens on the outlet side into the second tank 4 and on the raw side into the first fuel filter 7 or respectively upstream thereof into the fuel line 5. In the region of the first return line 13, a preheating valve 14 is arranged here, which distributes the fuel, flowing back from the internal combustion engine 2, to the first fuel filter 7 and/or to the second tank 4. The second tank 4 is connected, in turn, to the first tank 3 via a separate second return line 15. Furthermore, a sensor arrangement 16 is provided, which detects a thickening, due to temperature, of the fuel or a clogging of the first or second fuel filter 7, 11. The sensor arrangement 16, which according to FIG. 1 can comprise at the most varied of locations the most varied of sensors, for example pressure sensors and/or temperature sensors, is additionally connected in a communicating manner to a control/regulation arrangement 17, which in turn is connected in a communicating manner to the preheating valve 14 and in addition is able to control the latter as a function of the parameters transmitted by the sensor arrangement 16, for example temperatures and/or pressures.

Furthermore, a moisture sensor 18 for determining the water content present in the fuel can be arranged in the first tank 3. In the first tank 3, furthermore, a filling level detection arrangement 19 can also be arranged, which is likewise connected in a communicating manner to the control/regulation arrangement 17. The fuel supply system 1 according to the invention can be arranged here in a motor vehicle 20.

With the fuel supply system 1 according to the invention and in particular with the control/regulation arrangement 17, the entire fuel management can be configured distinctly more efficiently, wherein in addition the fuel supply system 1 according to the invention can be constructed in a structurally simpler manner than hitherto.

According to the general idea of the invention, a method according to the invention for operating this fuel supply system 1 is also proposed, in which generally a differentiation is made between four different operating modes I to IV, namely an operating mode I, which represents the normal operation, the operating mode II, in so far as there exists a risk of thickening of the fuel or a clogging of the fuel filter 7, 11, an operating mode III, in so far as there exists a risk of overheating of the internal combustion engine 2, and an operating mode IV, in which an active drying of the fuel takes place in the first tank 3.

In operating mode I, i.e. in normal operation of the internal combustion engine 2, only the amount of fuel which is also at the same time required, i.e. burned, in the internal combustion engine 2 is to be conveyed via the first fuel pump 6. Hereby, no fuel is directed from the internal combustion engine 2 or from the second tank 4 back to the first tank 3. In operating mode I, therefore, the electric power received by the first fuel pump 5 can be optimized and thereby an economical operation can be achieved.

In operating mode II, the control/regulation arrangement 17 switches the preheating valve 14, in the case of a corresponding signal of the sensor arrangement 16, such that the fuel flowing back from the internal combustion engine 2 is introduced into the fuel line 5 at least predominantly upstream of the first fuel filter 7, and thereby the fuel is heated. The operating mode II is used here in so far as there exists a risk of congealing or respectively a risk of thickening of the fuel. The comparatively warm fuel flowing back from the internal combustion engine 2 is not directed here by means of the preheating valve 14 into the second tank 4, but rather into the fuel line 5 via the preheating valve 14 upstream of the fuel filter 7. In particular in the case of a cold start of the internal combustion engine 2, in addition the heating arrangement 10 can be activated, which additionally heats the fuel.

The operating mode III occurs in so far as there exists a risk of the internal combustion engine 2 overheating. In order to protect the internal combustion engine 2 from overheating, the maximum fuel inlet temperature must be reduced. Conventionally, a cooler is used for this which, however, can generally be dispensed with in the fuel supply system 1 according to the invention. For this, in the case of a corresponding signal of the sensor arrangement 16, the control/regulation arrangement 17 switches the preheating valve 14 such that the fuel flowing back from the internal combustion engine 2 is introduced at least predominantly into the second tank 4, wherein the first fuel pump 6 conveys more fuel here from the first tank 3 into the second tank 4 than is burned by the internal combustion engine 2, so that comparatively warm fuel flows back via the second return line 15 from the second tank 4 into the first tank 3 and is mixed there with the colder fuel which is present there. On a renewed drawing of fuel from the first tank 3 and feeding thereof into the second tank 4, the fuel which is present there is cooled and is thereby fed in a cooled manner also to the internal combustion engine 2.

Finally, there is also the operating mode IV, in which the fuel is dried in the first tank 3. The fuel drying in operating mode IV is activated here for example in so far as the filling level detection arrangement 19 detects a filling of the first tank 3 with new fuel and hence with fuel with a comparatively high water content. In a similar manner, the operating mode IV can also be activated when the moisture sensor 19 detects an increased water content in the fuel in the first tank 3. A similar moisture sensor 19 can of course also be arranged in the region of the second tank 4 and can trigger the activation of the operating mode IV. In the operating mode IV, the first fuel pump 6 pumps fuel here from the first tank 3 through the first fuel filter 7 into the second tank 4, wherein as a function of the operating state of the internal combustion engine 2 the fuel, dried in the first fuel filter 7, is fed exclusively to the internal combustion engine 2 or flows back at least partially via the second return line 15 from the second tank 4 into the first tank 3 and is mixed with the fuel which is present there.

Generally, a differentiation is made here between two different operating states of the internal combustion engine 2 or respectively of the motor vehicle 20:

The first operating state concerns here the full load state, in which no drying of the fuel is possible, because the fuel flowing through the first fuel filter 7 and the water separator 8, which is necessary for the drying, is completely burned in the internal combustion engine 2.

In the second operating state, the internal combustion engine 2 runs only under partial load, so that an active drying of the fuel is possible. For this, the first fuel pump 6 conveys approximately 50% more fuel into the second tank 4 than is burned in the internal combustion engine 2, so that fuel is directed back from the second tank 4 via the second return line 15 into the first tank 3. Through the drying of the fuel which has taken place in the first fuel filter 7 and in particular in the water separator 8 arranged there, the fuel present in the first tank 3 is always mixed with drier fuel, and namely until the moisture sensor 19 in the first tank 3 determines a predefined moisture content. Through the multiple throughflow of the first fuel filter 7 with the water separator 8 the water content in the fuel can be reduced here, wherein a circuit exists between first tank 3, fuel filter 7, second tank 4 and second return line 15.

Generally, moreover, further, in particular topography-dependent or GPS-dependent scenarios or respectively control strategies can be carried out. Thus, for example, a different program can be processed for travel on a level road than for an ascent, descent or a curved road or respectively stop-and-go traffic. Likewise, scenarios can be considered for example for commercial vehicles with regard to full load or respectively running empty.

Figure 2:
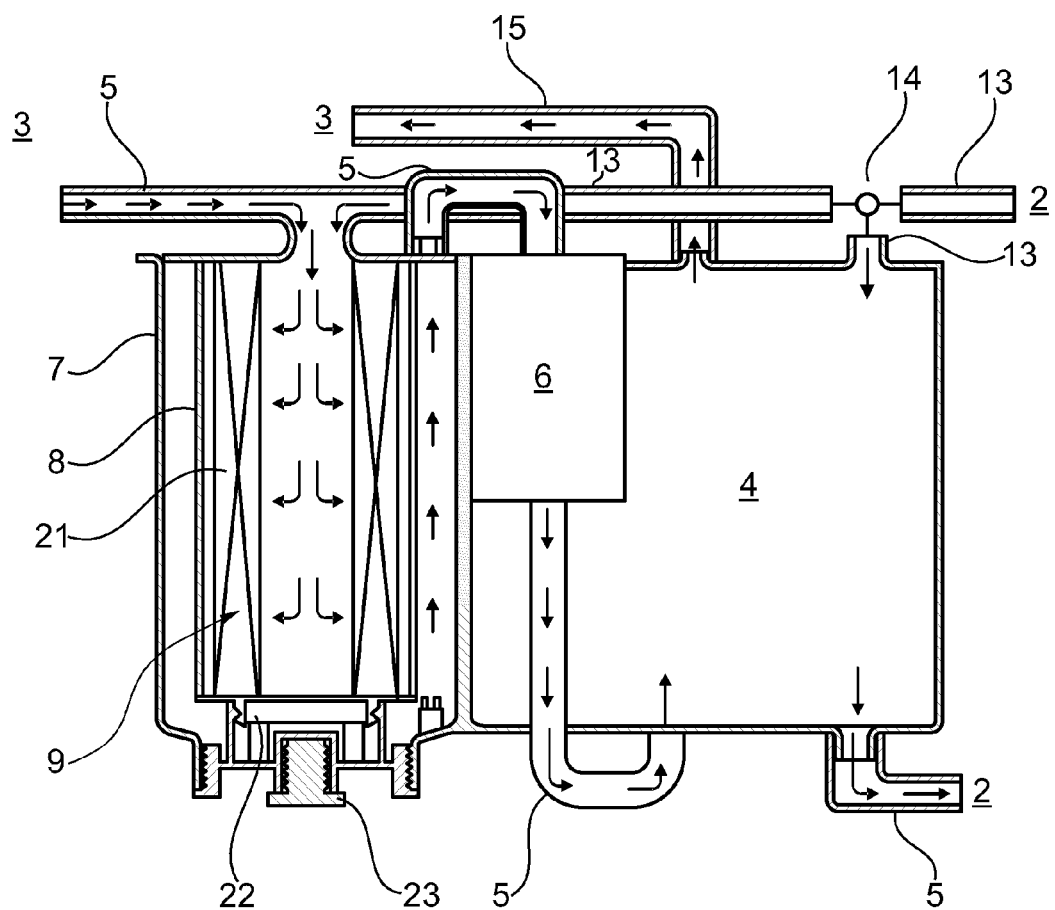
FIG. 2 a detail illustration of the fuel supply system according to the invention, in the region of the first fuel filter.

Now observing FIG. 2, the first fuel filter 7 can be seen therein with the water separator 8, for example a coalescer. Beneath a corresponding ring filter element 21 a water collecting space 22 is arranged here, via which for example via a corresponding water drain screw 23 the water separated in the water separator 8 can be drained. The preheating valve 14 is also illustrated, which distributes fuel, returned from the internal combustion engine 2, not illustrated, via the first return line 13, between the first fuel filter 6 and the second tank 4.

The second tank 4 can have a holding capacity of approximately 500 ml and is connected to the internal combustion engine 2 on the base side via the fuel line 5. The second tank 4 is connected to the first tank 3 via the second return line 15. In this case, the first fuel pump 6 is integrated into the second tank 4. It is also conceivable that the first fuel filter 7 and the second tank 4 present a shared assembly.

The invention claimed is:

1. A fuel supply system of an internal combustion engine, comprising:
    a first tank configured as a main tank and a second tank configured as a buffer reservoir, the first tank and the second tank connected to each other via a fuel line,
    a first fuel pump and a first fuel filter configured as a pre-filter arranged between the first tank and the second tank,
    a second fuel pump and a second fuel filter arranged between the second tank and the internal combustion engine,
    at least the first fuel filter including a water separator for separating water from the fuel,
    a first return line fluidly connected to the internal combustion engine on an inlet side and to the second tank on an outlet side and the first fuel filter on a raw side, and
    a preheating valve arranged in the first return line, wherein the preheating valve is configured to distribute the fuel, flowing back from the internal combustion engine, to at least one of the first fuel filter and the second tank,
    wherein the second tank is connected to the first tank via a second return line.

2. The fuel supply system according to claim 1, further comprising a sensor arrangement configured to detect at least one of a thickening of the fuel at least in response to a temperature change and a closing of at least one of the first fuel filter and second fuel filter.

3. The fuel supply system according to claim 2, wherein the sensor arrangement includes at least one of a pressure sensor and a temperature sensor.

4. The fuel supply system according to claim 2, further comprising a control/regulation arrangement operatively connected to communicate with the preheating valve and the sensor arrangement, and wherein the control/regulation arrangement is configured to control the preheating valve in response to signals transmitted by the sensor arrangement.

5. The fuel supply system according to claim 4, further comprising a filling level detection arrangement disposed in the first tank, wherein the filling level detection arrangement is connected in a communicating manner to the control/regulation arrangement.

6. The fuel supply system according to claim 1, further comprising a moisture sensor disposed in the first tank configured to detect a water content contained in the fuel.

7. A motor vehicle, comprising:
    an internal combustion engine; and
    a fuel supply system configured to supply fuel to the internal combustion engine, wherein the fuel supply system includes:
        a first tank corresponding to a main tank and a second tank corresponding to a buffer reservoir, wherein the first tank and the second tank are connected to one another via a fuel line;
        a first fuel pump and a first fuel filter arranged between the first tank and the second tank;
        a second fuel pump and a second fuel filter arranged between the second tank and the internal combustion engine;
        a water separator coupled to at least the first tank for separating water from the fuel;

a first return line fluidly connected to the internal combustion engine on an inlet side and the second tank on an outlet side and the first fuel filter on a raw side;

a preheating valve arranged in the first return line, wherein the preheating valve is configured to distribute the fuel flowing back from the internal combustion engine via the first return line to at least one of the first fuel filter and the second tank; and a second return line fluidly connecting the second tank to the first tank.

8. A method for operating a fuel supply system, comprising:

a first tank corresponding to a main tank and a second tank corresponding to a buffer reservoir, wherein the first tank and the second tank are connected to one another via a fuel line;

a first fuel pump and a first fuel filter arranged between the first tank and the second tank;

a second fuel pump and a second fuel filter arranged between the second tank and an internal combustion engine;

a water separator coupled to at least the first tank for separating contaminants from the fuel;

a first return line fluidly connected to the internal combustion engine on an inlet side and the second tank on an outlet side and the first fuel filter on a raw side;

a preheating valve arranged in the first return line, wherein the preheating valve is configured to distribute the fuel flowing back from the internal combustion engine via the first return line to at least one of the first fuel filter and the second tank; and a second return line fluidly connecting the second tank to the first tank;

wherein the method includes the steps of: differentiating between at least four different operating modes, and wherein the at least four operating modes include an operating mode I representing a normal operation, an operating mode II representing a risk of at least one of a thickening of the fuel and a clogging of at least one of the first fuel filter and the second fuel filter, an operating mode III representing a risk of the internal combustion engine overheating, and an operating mode IV initiating an active drying of the fuel in the first tank.

9. The method according to claim 8, wherein the operating mode I includes conveying an amount of fuel via the first fuel pump in response to an amount of fuel that is burned by the internal combustion engine.

10. The method according to claim 8, wherein the operating mode II includes switching via a control/regulation arrangement the preheating valve into a position introducing the fuel flowing back from the internal combustion engine into the fuel line at least predominantly upstream of the first fuel filter for heating the fuel.

11. The method according to one of claim 8, wherein the operating mode III includes switching via a control/regulation arrangement the preheating valve into a position introducing the fuel flowing back from the internal combustion engine at least predominantly into the second tank, and conveying an amount of fuel via the first fuel pump from the first tank into the second tank that is greater than an amount of fuel that is burned by the internal combustion engine, so that via the second return line the warmer fuel flows back from the second tank into the first tank and mixes with the colder fuel.

12. The method according to one of claim 8, wherein the operating mode IV includes conveying the fuel via the first fuel pump from the first tank through the first fuel filter and into the second tank, and drying the fuel in the first fuel filter and communicating the dried fuel at least one of to the internal combustion engine and at least partially back to the first tank from the second tank via the second return line for mixing with the fuel.

13. The method according to claim 12, wherein at least one of:

drying the fuel includes drying the fuel for a predetermined duration in response to a predefined moisture content, and activating the fuel drying in response to a detected filling of the first tank with fuel.

14. The motor vehicle according to claim 7, further comprising a sensor arrangement configured to detect at least one of a thickening of the fuel in response to a temperature change and a closing of at least one of the first fuel filter and the second fuel filter.

15. The motor vehicle according to claim 14, wherein the sensor arrangement includes a pressure sensor.

16. The motor vehicle according to claim 14, wherein the sensor arrangement includes a temperature sensor.

17. The motor vehicle according to claim 14, further comprising a control/regulation arrangement configured to communicate with the preheating valve and the sensor arrangement, and wherein the control/regulation arrangement is configured to control the preheating valve in response to signals transmitted from the sensor arrangement.

18. The motor vehicle according to claim 17, further comprising a filling level detection arrangement disposed in the first tank, wherein the filling level detection arrangement is in communication with the control/regulation arrangement.

19. The motor vehicle according to claim 17, further comprising a moisture sensor coupled to the first tank configured to detect a water content contained in the fuel.

20. The motor vehicle according to claim 7, further comprising a moisture sensor coupled to the first tank configured to detect a water content contained in the fuel.

* * * * *